United States Patent [19]
Vasterling

[11] 3,927,157
[45] Dec. 16, 1975

[54] HIGH TEMPERATURE RESISTANT PRODUCTS AND METHODS FOR MAKING THE SAME

[75] Inventor: Paul F. Vasterling, Westminster, Calif.

[73] Assignee: HITCO, Irvine, Calif.

[22] Filed: July 26, 1971

[21] Appl. No.: 165,971

Related U.S. Application Data

[63] Continuation-in-part of Ser. No. 851,946, Aug. 21, 1969, abandoned.

[52] U.S. Cl. ............... 264/29; 264/49; 264/344; 264/DIG. 19; 423/447
[51] Int. Cl. ............................................ C01b 31/07
[58] Field of Search ........ 264/29, DIG. 19, 140, 49, 264/344, 330; 423/448, 447

[56] References Cited
UNITED STATES PATENTS

| | | | |
|---|---|---|---|
| 302,134 | 7/1884 | Hickman et al. | 264/29 |
| 3,011,981 | 12/1961 | Soltes | 423/448 UX |
| 3,233,014 | 2/1966 | Bickerdike et al. | 264/29 |
| 3,301,742 | 1/1967 | Noland et al. | 264/29 X |
| 3,321,327 | 5/1967 | Blanchard et al. | 264/29 X |
| 3,337,526 | 8/1967 | Adams | 260/209 |
| 3,407,038 | 10/1968 | Beasley | 264/29 X |
| 3,508,872 | 4/1970 | Stuetz et al. | 423/447 |
| 3,534,803 | 10/1970 | Bickerdike et al. | 264/DIG. 19 |
| 3,552,533 | 1/1971 | Nitz et al. | 264/DIG. 19 |
| 3,639,197 | 2/1972 | Spain | 264/DIG. 19 X |

Primary Examiner—Jeffery R. Thurlow
Attorney, Agent, or Firm—Fraser and Bogucki

[57] ABSTRACT

Improved all-carbon composite products and methods for providing the same utilize carbon particle filled, thermosetting pastelike binders and porous cellular graphite reinforcement, separately or in combination. Such constituents when processed in accordance with the invention provide dense, uniform bodies with significant freedom from internal voids and excellent interface characteristics between the matrix and reinforcement. These characteristics are moreover achieved by the use of relatively low cost, high production molding techniques that enable achievement of partially carbonized states in short time intervals. Products thus provided may include a substantially homogenous carbonized matrix interspersed into cells of fibrous graphite reinforcement of defibrated wood origin. The fibrous graphite material is advantageously provided through the initial chemical extraction of defibrated masses of non-uniform fibrous material derived from *Larix occidentalis* wood material, followed by carbonization and graphitization at successively increased temperatures in an inert environment. Novel products are also provided in which discrete essentially homogenous carbon matrix layers separate but firmly unite carbon fabric reinforcement layers.

4 Claims, 7 Drawing Figures

INVENTOR.
PAUL F. VASTERLING
BY Fraser and Bogucki
ATTORNEYS

HIGH TEMPERATURE RESISTANT PRODUCTS AND METHODS FOR MAKING THE SAME

CROSS REFERENCES TO OTHER APPLICATIONS

This application is a continuation-in-part of my previously filed application, entitled "High Temperature Resistant Products and Methods for Making the Same," Ser. No. 851,946, filed Aug. 21, 1969 and now abandoned.

BACKGROUND OF THE INVENTION

Carbon-carbon composite structures and elements are now widely employed for insulative and ablative applications. Such structures are characterized by having a carbon or graphite fiber reinforcement in a carbon or graphite matrix. For purposes of definitiion hereafter, the term "carbon" is intended to be used generically, to encompass both amorphous carbon fibers and matrices and the graphitic crystalline forms, as well as intermediate forms that are neither purely amorphous nor purely crystalline, as long as the carbon content is high, such as in excess of 96% and typically 98 or 99%. Where the specific graphitic form is being denoted, the term "graphite" is used, and when the amorphous carbon form is being denoted, the term "amorphous" is specifically used.

There has long been usage of carbon and graphite bodies of essentially homogeneous character as refractory structures and elements for high temperature application. In the homogeneous form, however, strength is often inadequate unless the unit is made extremely thick and heavy in which case weight or cost can be excessive. In any event homogeneous structures as previously made are subject to cracking and breaking and have relatively low resistance to substantial mechanical forces. At the other extreme, in terms of cost, ablative and insulative structures foe aerospace and other applications have been highly developed for such applications as rocket nozzles, heat shields and the like.

The all-carbon composites used in these applications have typically employed a carbon fiber fabric laminate in a carbonized matrix. The fibers in the fabrics ae typically disposed in particular orientations, with the carbon fabrics themselves being fabricated by heat treatment cycles from rayon or other precursors, as disclosed in the patent to Millington, U.S. Pat. No. 3,294,489. However, the base costs of the fabrics themselves, and various specific processing requirements that contribute greatly to fabrication time and expense, render such products too expensive for many of the great number of industrial applications for which the homogeneous carbon products are used. The parts often must be post cured slowly and precisely (e.g. 96–100 hours). Then carbonization of the matrix must typically be accomplished very slowly to limit internal voids, cracks and inherent weaknesses. Carbonization must often be followed by reimpregnation and reinfiltration steps as a matter of necessity to fill the voids caused by outgassing and to improve physical characteristics generally. Such long and complex processing sequences inevitably contribute to very high costs, but reliability is not thereby assured.

A part is typically laid up as a laminate, with the fabric being impregnated in a coating tower with a suitable proportion of resin, and unified under temperature and pressure with the fabric layers in contact. It is often found that despite the exercise of the best controls, cracking and delamination can arise during molding or during carbonization, or during usage of the part under exposure to operative conditions. These problems typically arise from imperfections at the interface between the fibers and the encompassing matrix, and from voids and other non-uniformities in the matrix. Differential shrinkage and outgassing during carbonization are the two principal causes of these defects. To minimize such problems, long duration and therefore costly molding and post cure cycles are utilized. Thereafter in many instances voids must be filled by impregnation and reinfiltration techniques that also substantially increase costs.

Various expedients are under investigation and have been proposed for attempting to lower costs and improve reliability in carbon-carbon composites. The patent to Beasley, U.S. Pat. No. 3,407,038, for example, shows the usage of a shredded carbon or graphite cloth to achieve physical properties in the resultant composite that are relatively free of directionality. There is no cost savings in this approach as far as the fibrous constituent is concerned, inasmuch as the shredded material is prepared from the relatively expensive carbonized textile. The use of chopped fibers in a molding compound takes advantage of identical approaches that have been employed with chopped glass fibers and other reinforcement fibers, and thereby facilitates the molding of a desired complex shape.

A number of other suggestions have been made as to the use of low-cost carbonaceous material for insulative purposes. For example, the use of various precursors of synthetic or natural materials was proposed by Abbott in U.S. Pat. No. 3,053,775, and Stuetz et al. in U.S. Pat. No. 3,508,872 proposed the treatment of wood to prepare graphite fibrils. Neither patent discloses a carbon product suitable for the formation of improved carbon-carbon composites over the present state of the art. The Abbott teaching results in a partially carbonized, essentially very weak structure that cannot readily be handled. The Stuetz et al. patent is based primarily upon the use of a pre-oxidation step toward the provision of what appears to be microscopically divided fibrillar product. The use of this product is suggested for conventional construction materials, such as dry wall, wall boards, pipes, tiles and the like. These minute fibrillar materials only partially contribute to the strength fiber-matrix the matrices in which they are used, and in any event have the same inherent bonding problems at the fibr-matrix interface.

While thermal conductivity of an insulative body is often closely allied with ablative characteristics as a desirable property, there are many non-ablative applications in which it is desired to use a carbon-carbon system for high temperature resistance and insulative properties alone. In many of these applications the weight and expense of textile derived carbon fibers are unsuitable, and the thermal conductivities of prior art structures are unacceptably high. Insulative needs exist in high speed aircraft, including fire wall and engine and cell structures. Many industrial carbon and graphite parts now made of monolithic construction, can be greatly improved if their structural properties caan be substantially increased. Graphite parts that are subject to mechanical stress or impacting forces, for example, can be used for much longer intervals under such conditions if reinforced. In these and many other applications low thermal conductivity, low thermal expansion, excellent resistance to thermal shock and good dimensional stability at a wide range of temperatures are required. In addition, the material should be readily moldable into complex shapes and machinable after preparation.

SUMMARY OF THE INVENTION

Carbon-carbon composite products, and methods of making the same, may utilize either an improved carbon-filled carbonizable paste-like binder and a porous, cellular, non-uniform defibrated fibrous carbon mass as reinforcement, or both. The fibrous mass is provided preferably by carbonization of previously chemically extracted macerated fibrous pulp of Larix Occidentalis origin.

In a preferred system in accordance with the invention, carbon-carbon composite products comprise both a porous, cellular, non-uniform fibrous graphite reinforcement and a carbonized binder that initially includes a knittable thermosetting resin and approximately 50% or more of carbon particle filler in the form of coke. By "knittable" is meant that the resin retains structural integrity but does not assume a hard set during outgassing, so that gases can escape but voids are filled by compaction. Both the cellular reinforcement and the carbon particle fillers appear to provide gas escape routes in this system, and the cellular structure further appears to eliminate internal strains during shrinkage. The binder readily interfaces with and penetrates the fibrous reinforcement at low molding temperatures, partially being carbonized at these temperatures, hereafter forming a homogeneous carbon matrix in which the carbon filler particles are uniformly dispersed. Moreover, the filler particles chemically bond to the matrix during processing. Composites of this type are remarkably free from cracking and delamination although they can be processed at accelerated rates. Such composites obviate the need for reimpregnation and reinfiltration procedures in many instances, thus providing much less expensive parts of suitable quality. They also provide superior strength and insulative properties as well as excellent resistance to thermal shock. Substantial cost advantages in processing are obtained because curing and partial carbonizing cycles can be significantly accelerated due to the much more efficient outgassing aided by the cellular reinforcement and carbon particle filler.

The present invention encompasses methods for preparing improved graphitized fibrous reinforcement materials, and such products themselves, and also improved carbon-carbon systems utilizing various reinforcements but incorporating the essentially paste-like thermosetting binder materials containing approximately 50% or more carbon filler in the form of coke. In accordance with the invention, the graphitized fibers or fibrous masses are prepared from at least partially chemically extracted and macerated wood fibers which are converted and stabilized at high temperatures prior to impregnation and further processing. The resulting fibers or fibrous masses are cellular and highly porous, easily impregnated at relatively low pressures and temperatures and quite dimensionally stable during further carbonization and graphitization of the composite at high temperatures. The process comprises the steps of:

1. Chemically extracting the carbohydrate wood sugars to provide a macerated wood pulp in which the fiber constituents are non-uniform in size and shape, but porous and internally cellular in character;

2. Heating these wood fibers in an inert atmosphere at successively high temperatures up to at least about 3800° F.;

3. Cooling the fibers in an inert atmosphere and thereafter mixing the fibers with a carbonizable binder material to form a molding composition;

4. Molding the composition to the desired shape to a temperature sufficient to cure and partially carbonize the binder; and 5. Then carbonizing the binder at successively high temperatures in an inert atmosphere.

Depending on the binder material and the requirements of the part, the products may be additionally treated by one of the part, the products may be additionally treated by one or more of the following steps:

6. Reimpregnate with binder and recarbonize;

7. Pyrolyze the structure at graphitization temperatures of at least about 4000° F. under an inert atmosphere;

8. Heat in the presence of a hydrocarbon gas to deposit pyrolytic carbon or graphite on the surface and within the pores of the heated structure.

Improved carbonizable binders in accordance with the invention are also of separate and distinct utility with other types of reinforcement. In one specific example they comprise 30–40% of thermosetting resins of the furfuryl type, with the remainder comprising essentially carbon filler in the form of coke of finer than approximately 60 mesh size. The mixture has the consistency of a paste-like slurry and is mixed with a random fiber or fibrous mass, or coated onto fabric or other reinforcement layers. Under molding temperatures and pressures elimination of volatiles commences readily, but the resin maintains a semi-gel characteristic that has structural integrity but permits gases to escape. The escape of gases is augmented by the presence of the filler particles, and the voids do not remain but are filled by compaction until a point is reached at which the system is fully carbonized before taking a hard set. Composites having high proportions of binder, including discretely layered systems, with superior inter-laminar shear properties, are provided for the first time.

DETAILED DESCRIPTION OF THE INVENTION

Figure 1:
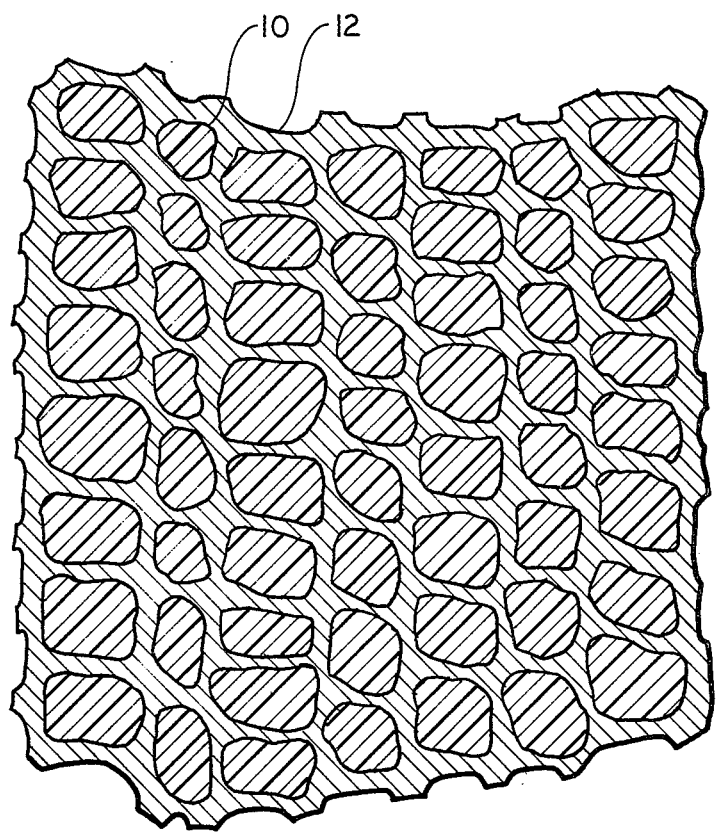
FIG. 1 represents a 500X magnified view of the cellular structure of a carbon-carbon composite product in accordance with the invention.

New fibrous reinforcement material for carbon-carbon composites, derived from wood precursor will be considered first in the following description. The materials may be referred to as "fibers" for convenience and because the material is essentially fibrous in appearance and characteristic. As is more evident from the detailed description hereafter, however, when considered in detail these fibrous masses are non-uniform in length, diameter and shape and have porous and cellular characteristics.

The wood fibers utilized in the process of the invention may be obtained from either hard woods or soft woods. Hard woods such as birch, mahogany, oak, hickory, ash and the like, although suitable, are relatively expensive and offer little advantage, if any, over soft wood fibers in realizing properties of composites. Fibers from pine, fir, spruce, hemlock, balsa, bamboo and the larch woods are of low cost and greater availability, and do not suffer from this deficiency. It is preferred to use Western larch wood (*Larix occidentalis*) that has been subjected to an extraction process to remove oils, sugars, sap, and other natural leachable materials present in the raw wood. Common techniques for removing these materials are well understood to those skilled in the art and comprise a leaching treatment with suitable solvents or chemicals. For example, as described in U.S. Pat. No. 3,337,526, Western larch wood fibers are treated with aqueous liquid solvents, either water or dilute acid solutions to remove carbohydrate wood sugars and the like, specifically to provide arabinogalactan as the primary product in high concentration and with low impurity levels. Although not absolutely necessary, such pretreatment of the wood or fibers yields a defibrated fibrous precursor of porous surface and short length which is relatively easily carbonizable and such fibers are preferred in the present invention. Chemical extraction to approximately 80% or more of the carbohydrate wood sugars preserves the porous cellular character of the fibrous matter. On the other hand, such mateials may be removed from the wood directly by pyrolysis during carbonization at controlled temperatures and under inert atmospheric conditions to avoid degradation of the fibrous structure, although such step is more time consuming, costly and does not yield a comparable cellular structure.

The fibers may be of any suitable length as are commonly produced by simply milling or otherwise macerating the wood. Fibers having individual lengths between approximately ⅛ to about 1 inch and diameters between about 0.02 and about 0.25 inch are preferred although fibers having other sizes may also be used. By the term "wood fibers" in the description hereof, it is intended to include individual fibers or small bundles of two or more fibers obtained in the usual way from macerating or milling wood pieces. It is not especially critical that small bundles of fibers be specifically broken up during processing of the invention so long as they can be carbonized and sufficiently mixed with the resin to form a molding composition. For uniformity, a mass of material may be screened to pass selected filters after chemical extraction but before further treatment.

During carbonization, the wood fibers are exposed to inert atmospheric conditions in a furnace or other suitable vessel provided with heating means and parts or similar means for injecting an inert gaseous stream, continuously or intermittently, and for removing gases driven from the carbonizing fibers. Suitable inert gases include nitrogen, argon, helium, and the like as well as reducing gases such as hydrogen. It is understood that oxidizing gases or those containing oxygen are to be avoided to prevent combustion of the heated carbonizing fibers. Continuous injection of the inert atmosphere is preferred with concomitant removal of off-gas products expelled from the fibers during carbonization, thereby avoiding deposition or infiltration of undesired materials on the fibers.

Initial carbonization temperatures are between about 250° and up to about 1500° F. It is most important that the fibers be heat processed through an initial carbonization phase between about 300° and about 700° F. Temperatures increase slowly and continuously, or are raised to successively higher steps and held there for a time sufficient to complete pyrolysis of the fiber materials and drive off gases at the successive increments. specific heating times throughout initial carbonization will depend on whether the fibers have been previously leached to remove sugars, etc. Generally, it is preferred that the heating schedule be such that temperatures are elevated between about 20° and about 100° F. per hour although slower heating may also be used.

Following the initial carbonization, the carbonized fibers are fired at temperatures between about 1800° and about 2400° F. for a few seconds and up to about 10 minutes to remove additional volatiles. Again, as in the initial carbonization treatment, the firing step is carried out under inert atmospheric conditions. The process thus described is essentially in accordance with the teaching of the patent to Millington, U.S. Pat. No. 3,294,489. The fibers are thereafter stabilized at temperatures between about 3800° to about 5500° F. under inert atmospheric conditions and preferably at about 4400° F. Exposure times of between a few minutes to a few hours are usually sufficient to stabilize the fibers so as to eliminate further shrinkage and achieve an essentially graphitic state.

It should be appreciated that although the above treatments have been described as separate temperature zones, the fibers may alternatively be heated successively between the 300° and 5500° F. temperature either with or without cool down during certain stages of the process. Again, it is only important that the fibers remain exposed to the described specific temperatures for a time sufficient to complete drive off of volatile materials. For example, following initial carbonization up to about 1500° F., thereafter the fibers may be cooled and later fired and stabilized or may be heated directly to the higher firing and stabilization temperatures. Alternatively, the heating process may be interrupted following firing and before stabilization and thereafter continued at the higher temperatures. However, it is to be understood that where the heating cycles are interrupted, the fibers must be cooled down to about 300° F. or otherwise maintained in an inert atmosphere to prevent combustion and fiber degradation.

Following carbonization and stabilization, the fibers are impregnated or mixed thoroughly with a carbonizable resin to form a molding composition. The higher cellular and porous nature of the fibers results in molding compositions having high resin : fiber weight ratios. Suitable resins include the well known phenolic resins such as phenol-formaldehydes, epoxy resins such as glycidyl polyethers of polyhydric phenols, furfuryl and furfuryl alcohol resins, polyimides, and the like. The selection of the specific resin is only important in that it be carbonizable on heating to the elevated temperature ranges specified herein. It is also important that the resin be heat curing or thermosetting at relatively low temperatures so that the molding composition, although easily moldable at ambient temperatures, will cure sufficiently at temperatures between about 200° and about 500° F. in order that the shape and dimensional characteristics of the part during resin carbonization is essentially maintained. The resin is preferably one having relatively low shrinkage during carbonization. The amount of resin utilized in preparing the moldable fiber composition may be varied depending on the type of resin, its viscosity and carbonization characteristics and the like. However, it has been found that amounts between about 35 and about 65% by weight based on the total weight of the molding composition are suitable with resins having viscosities at ambient temperatures by which they can be easily handled and molded. The mixing or impregnation of the fibers by the resin may be carried out in any suitable manner. It has been found that the wood fibers heated according to the above-described schedule are extremely porous and cellular in character and easily wetted by resins under ambient conditions with little or no additional pressures needed. Thus, the stabilized fibers of wood precursor materials prepared by the invention have the desirable characteristics of being easily and thoroughly impregnated by resins under esentially ambient conditions when compared with other carbonized or graphitized fibers prepared from precursors such as rayon, polyacrylonitrile and the like. Further, the cellular characteristic appears to absorb differential shrinkage during processing. These advantages are of great significance since fibers heated to temperatures above about 3800° F. are brittle and tend to break or crack when exposed to high pressures usually required during molding. Yet, the fibers of the present invention obviate such a problem since high pressure molding procedures need not be used. For example, on an equal fiber basis the amount of resin impregnated in the fibers of the invention may be up to about 5–6 times that of conventional carbonized rayon fibers.

For certain products it may also be desirable to incorporate carbonized or graphitized rayon, polyacrylonitrile or similar fibers in the molding compositions. High modulus graphite fibers are especially preferred where improved strength characteristics are important. The term high modulus graphite fibers is well understood in the art and herein includes fibers having a Young's modulus of greater than $10 \times 10^6$ psi and a tensile strength in excess of $100 \times 10^3$ psi. Preferred fibers have a modulus in excess of $20 \times 10^6$ psi. Such fibers may be conveniently mixed with the stabilized wood fibers and thereafter suitable amounts of resin added to prepare the molding composition as previously described. High modulus graphite fibers are preferably present in a minor amount. Generally wood : graphite fiber ratios between about 20:1 and about 1:1 are useful with ratios between about 10:1 and 3:2 especially preferred. Greater amounts of high modulus fibers are offset by concomitantly reduced resin impregnation.

Following mixing and preparation of the fiber-resin molding composition, it may be placed into a molding apparatus having a mold cavity of the desired shape and heated under pressure to cure the resin matrix. The mold is preferably although not necessarily preheated. The shaped composition is then merely heated to resin cure temperatures which, for a phenolic resin, are up to about 350° and 700° F. respectively. Again, high pressures need not be utilized above those that will effect the cure of the resin to the desired state while maintaining the shape of the part. Usually pressures of between about 500 and 1500 psi are sufficient. It is to be understood that the specific temperatures set forth relate to a phenolic resin system and accordingly somewhat different temperatures may be required where other resins are utilized still within the purview of the invention. Another significant advantage of resin impregnated compositions incorporating stabilized fibers of the invention is in the ease and relatively short times required to mold and cure the products. For example, whereas parts prepared from resin impregnated carbonized or graphitized rayon fibers often require that temperatures sufficient to cure and post cure the resin be maintained for at least about 1 hour per inch of part thickness, composition of the present invention requires average times of only about 10 minutes per inch. Although the reasons for such an advantage are not fully understood, it is believed that the high porous and cellular nature of the stabilized wood fibers provide for improved transfer of heat throughout the structure as well as removal of volatilizing gases. Further, extended separate cure and post cure cycles need not be utilized as are normally required for molding compositions using carbonized rayon fibers. Instead, the composition of the invention may be cured at about 350° F. for sufficient time depending on part thickness and then directly partially carbonized by increasing the temperature to about 700° F. at temperature increases of, for example, 25° F. per minute in the case of a phenolic resin system. The part may then be removed hot or cooled down before proceeding to further processing.

Products prepared by the above-described processing techniques may be used directly for certain applications or further treated as will be described hereinafter. For example, compositions cured at 350° F. (phenolic resin) may be used directly in ablative components such as low pressure thrust chambers, blast tubes or heat shields and the like. Parts which have been exposed to partial carbonization temperatures may be used for example as high temperature insulators, etc.

Following cure and partial carbonization where additional processing is desired the molded part is removed from the molding apparatus and placed in a furnace under inert atmospheric conditions and the temperature raised to carbonize the resin under the inert atmospheric conditions. For most easily carbonizable resins, temperatures up to about 1800° F. are sufficient. For example, in the case of phenolic resin, temperatures of at least about 1500°F. are preferred. However, it will also be appreciated that control of the process is achieved by slowly elevating temperatures in the same manner as previously described for carbonization of the fibers. Thus, slow and controlled pyrolysis and removal of the volatile materials from the resin matrix under temperatures increasing at the rate of not greater than about 100° F. per hour is preferred. As an alternative in this stage of the process carbonization may be accomplished within the molding apparatus. Of course heated dies will be required with provisions such as slots or the like for removal of volatiles. Vacuum lines may be attached for this purpose.

Following carbonization of the resin, the part may be cooled down sufficiently to be stored under oxygen containing atmospheres or, directly processed to infiltration with pyrolytic carbon or to graphitize the resin. The carbonized products may be exposed to higher temperatures in the graphitizing range of up to about 5500° F. and preferably between about 3800° and about 4800° F. under inert or non-oxidizing atmospheres. Prior to this treatment the partially carbonized or fully carbonized precursor may be re-impregnated with resin. Although re-impregnation is optional, where greater density is desired such treatment fills small pores or voids caused by resin pyrolysis. Thereafter, the resin is cured, partially carbonized and may be fully carbonized and graphitized as previously described. Graphitization restores physical characteristics that are diminished by carbonization level treatment.

Figure 2:
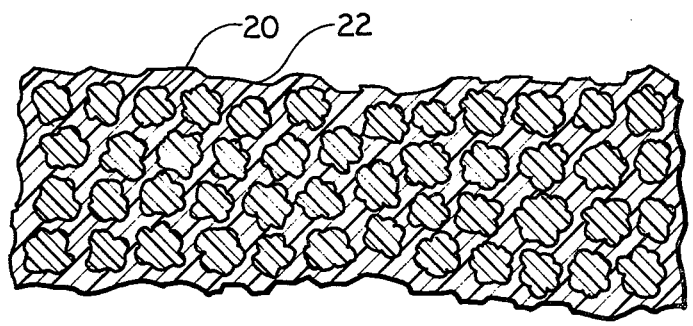
FIG. 2 represents a similarly magnified view of a carbon-carbon composite product using carbon fibers of rayon origin.
Figure 3:
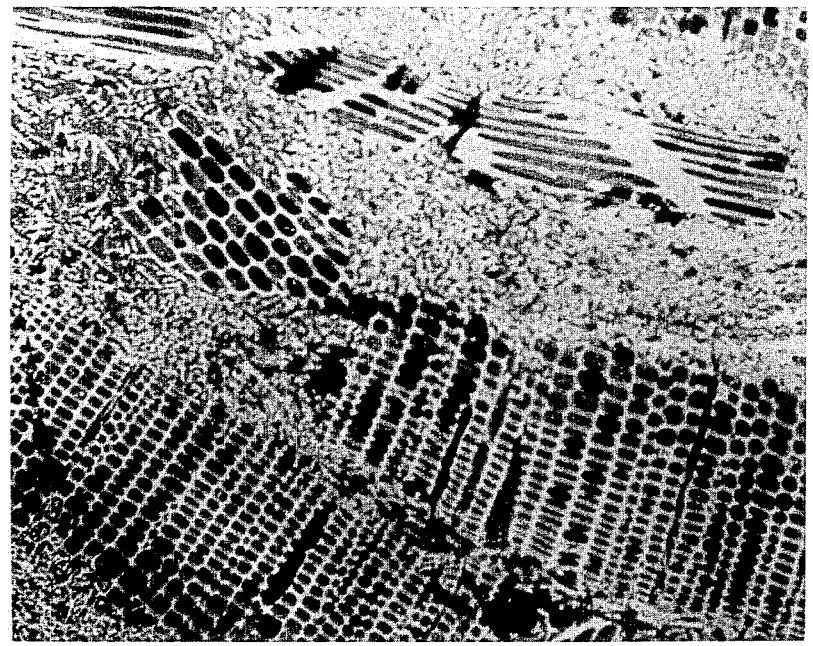
FIG. 3 is a 15OX photomicrograph of the carbon-carbon composite of FIG. 1, showing further details of the fibrous masses in the carbon binder.
Figure 4:
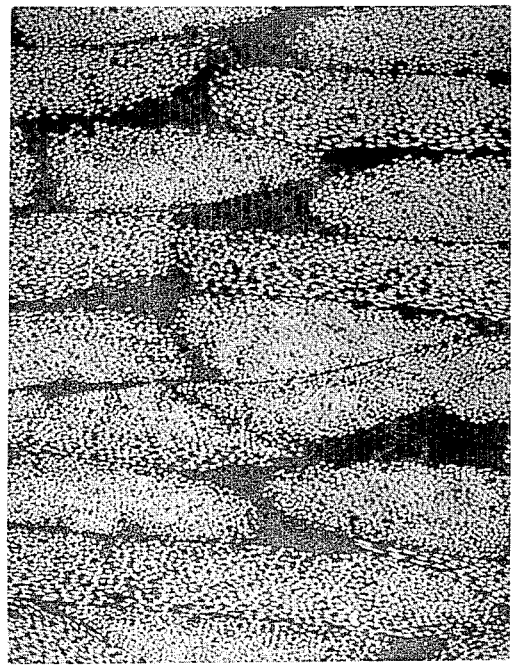
FIG. 4 is a 75X photomicrograph of the product of FIG. 2.

The nature of the carbonized products prepared by the above-described techniques is illustrated in FIG. 1 and FIG. 3. FIG. 1 represents a photomicrographic view magnified approximately 500 X of a small cutaway portion of a carbonized, pyrolized and infiltrated product containing stabilized fibers of wood precursor which has been resin impregnated and thereafter carbonized at temperatures of at least about 1500° F. The cellular areas 10 represent carbonized resin whereas the continuous cellular walls 12 represent the essentially graphitic cellular structure of a high temperature stabilized wood fiber. FIG. 3 is a photomicrographic view at 150 X of a larger portion, including the smaller section of FIG. 1. By comparison FIG. 2 represents a 500 X magnified representation of graphitized rayon fibers treated with a resin which composite has been treated at temperatures above about 1500° F. to carbonize the resin. The graphitized filaments 20 of rayon origin are seen as dense and uncellular surrounded by a carbonized resin matrix 22. FIG. 4 is a 75 X view corresponding to FIG. 2, showing the fabric yarns of which the individual filaments are part, but with an uncarbonized binder.

FIGS. 1 and 2 essentially are representations of photomicrographs of prepared surfaces of the designated composite products, whereas FIGS. 3 and 4 are themselves photomicrographs. Whereas FIG. 2 shows individual graphitized filaments, it should be appreciated that FIG. 1 represents a small portion of one graphitized reinforcement element, and further illustrates the carbonized binder 10 impregnated within the cellular structure 12 of that single element. The binder initially comprised a phenolic resin, specifically phenolformaldehyde resin sold under the trade designation FO64 by U.S. Polymeric, Inc. A better understanding of the relationships may be had by reference to the FIG. 3 view, taken at lesser magnification, of the same prepared section as FIG. 1. In FIG. 3 various ones of the individual fibrous masses or "fibers" may be seen at different orientations and distributions within the binder. The cells are defined as the light-shaded boundaries while carbon impregnation within the cells is gray in shade, and the darkest areas represent internal voids. Most large irregularly shaped voids result from minute surface tears arising during cutting of the section for photography and not from the processing itself. The irregular, finer patterns between the variously oriented fibrous elements define the binder portions. Here it is evident that although the fibrous reinforcement is larger, typically, and varies in size and shape, in comparison to fiber reinforcement of rayon precursor material, the porous cellular characteristic takes full advantages of the properties of a reinforced composite by virtue of the intimate relation between the fibrous masses and the impregnating binder. As is well known, the strength contributed by the reinforcement is related in large measure to the surface area which the reinforcement presents, when there is intimate union with the binder material. The porous cellular characteristic significantly augments the properties of the system. However, the binder/reinforcement ratio is high, and the product is thus dense as well as strong.

The prior description deals principally with the use of largely conventional resin impregnations, such as are applied in essentially liquid form in coating towers and partially cured to a tacky state. Examples are given hereafter of the use of a material comprising an essentially paste-like slurry, and including approximately 50% or more of carbon particle fillers as well as particular thermosetting resins in high proportions to the reinforcement. Such binder mixes with and unites to the fibrous reinforcement in superior fashion, and makes a superior partially or fully carbonizable matrix for all carbon-carbon systems, in terms of freedom from cracking, delamination and other fabrication problems. In addition, binders of this origin can be carbonized to purities in excess of 99% without difficulty.

Composites of the present invention having increased and improved density characteristics are produced by infiltration with pyrolytic carbon or graphite. The previously described resin impregnated parts which have been cured and partially carbonized and especially those which are fully carbonized or graphitized may be porous in view of the high porosity and cellular structure of the stabilized wood fibers, with some resins. Although the pores of the fibers become extensively filled with the resin, pyrolysis of the resin during carbonization and graphitization results in diminishing of the original resin volumes within the composite and fiber pores. In order to increase the density as well as strength characteristics of the various products it may be desirable to further incorporate the following treatment.

Pyrolytic carbon or graphite is deposited on and infiltrated into the structures by maintaining the surface of the part at temperatures between about 1400°–4500° F. or more while passing a hydrocarbon gas over the hot surface. Preferred carbon infiltration temperatures are between 1400° and 2800°F. and preferably between about 1900° and 2600° F. Suitable gases include lower aliphatic hydrocarbons such as methane, ethane, propane, butane, ethylene, acetylene and mixtures thereof as well as benzene and the like. The hydrocarbon gases may also be diluted with inert gases such as argon, helium, nitrogen, etc. or by passing the hydrocarbon gases into hot vacuum furnaces containing the heated structures. Accordingly, hydrocarbon gas partial pressures may vary from 0.1 to 30% partial pressures for inert gas diluted systems and between about 1 to 100 mm Hg for vacuum systems. Composite surface temperatures may be as high as for example, 5500° F. It will be understood that surface temperatures above about 4000° F. will result in a more graphitic oriented deposit whereas lower surface temperatures will yield more amorphous carbon deposits. Where the part is intended to be used in extremely high temperature and/or ablative applications, graphite deposition may be preferred. It will also be appreciated that where graphite deposition is carried out, separate graphitization of the carbonized composite is not necessary since, at deposition temperatures of 4000° F. or more, the carbonized resin will also graphitize. Yet, complete carbonization i.e., stabilization of the structure at about 1500°–1800° F. should be carried out prior to the hydrocarbon infiltration step since volatiles driven off by pyrolysis at infiltration temperatures would tend to interfere with the carbon deposition. Infiltration times will vary depending on the density increase desired and/or part wall thickness. Minimum times are usually not less than about 15 hours whereas maximum times do not normally exceed about 500 hours. Naturally, infiltration temperatures, times, gas flow rates, etc. will vary as hydrocarbon concentrations are varied. However, these factors and their control will be appreciated by those skilled in the art. Following infiltration the part is cooled and may be honed, sanded or machined to yield the desired surface characteristics.

EXAMPLE I

Western larch wood fibers which has been leached with aqueous solvents according to a procedure described in U.S. Pat. No. 3,337,526 to remove soluble carbohydrates and having an average fiber length of about ½ inch and an average diameter of about 0.125 inch but varying size and shape were treated as follows:

The fibers were placed in an oven which had been purged with nitrogen and into which nitrogen was continuously introduced. The oven was heated to 300° F. for a period of 1 hour and thereafter the temperature was increased to about 700° F. at an average rate of about 50° F. per hour. The carbonized fibers were then transferred to a furnace and fired at about 2100° F. for about 5 minutes again under an atmosphere of nitrogen continuously introduced into the furnace. Thereafter, the fibers were stabilized and converted to essentially graphitic structure under nitrogen at a temperature of about 4000° F. for about 5 minutes.

Following stabilization, the fibers were allowed to cool and thereafter were mixed with a phenolic resin (phenolformaldehyde) comprising the resin sold under the trade designation FO64 of U. S. Polymeric, Inc. to achieve a molding composition having about 40% resin by weight. The composition was thoroughly admixed until the fibers were evenly distributed and of essentially random orientation in the binder.

The composition was injected into a mold of desired shape at a pressure of about 1500 psi. The mold was heated electrically to about 450° F. for about 15 minutes to cure the resin after which the temperature was increased to 750° F. for about 60 minutes to partially carbonize the resin. The part was then removed and on inspection was found to have no visible cracks. The fiber structures had some orientation because of the pressurization. The part was placed in a furnace under nitrogen atmosphere and heated from 480° F. to about 1500° F. over a period of about 24 hours. After transfer to a vacuum furnace, the temperature of the furnace was then elevated to 2150° F. for about 2 hours while nitrogen feed was continued. Thereafter the nitrogen flow was stopped, the furnace evacuated with vacuum pumps and natural gas was introduced at a uniform rate to provide a flowing atmosphere of 1 to 20 TORR pressure with 1½ TORR being preferred. Pyrolytic infiltration and deposition of carbon into the pores of the hot substrate was continued for about 90 hours. The natural gas was then turned off, the vacuum pumps stopped, nitrogen flow re-established and the furnace allowed to cool to room temperature.

The part was removed and it was found that the size and shape of the structure was essentially unchanged from that of the part obtained following the resin cure step prior to resin carbonization. The part contained no apparent cracks or breaks and was tested and found to possess the following characteristics:

| Tensile: | Strength (psi) | 1258 |
|---|---|---|
|  | Modulus (psi × $10^6$) | 0.95 |
| Flexural: | Strength (psi) | 2534 |
|  | Modulus (psi × $10^6$) | 1.16 |
| Compressive: | Strength (psi) | 6217 |
|  | Modulus (psi × $10^6$) | 1.63 |
| Specific gravity: | (g/cc) | 1.30 |
| Carbon Assay: |  | 99+% |

EXAMPLE II

Products were prepared according to the procedure of Example I with the exception that high modulus graphite fibers were mixed with the stabilized wood fibers prior to preparation of the resin containing molding composition. The high modulus graphite fibers were obtained from polyacrylonitrile fiber precursors which had been stretched during high temperature processing to improve modulus and tensile strengths. The fibers were cut to lengths of approximately ½ inch. In samples A and C the ratio of wood: graphite fibers was approximately 3:2 and samples B and D, 9:1 respectively. Further, in samples A and B the high modulus graphite fibers were undisturbed whereas in samples C and D the graphite fibers were fluffed by agitation in a high speed mixer or blender. Product strengths are reported as follows:

| Sample: | A | B | C | D |
|---|---|---|---|---|
| Tensile |  |  |  |  |
| Strength (psi) | 1420 | 1009 | 1550 | 1072 |
| Modulus (psi × $10^6$) | 2.74 | 1.67 | 2.51 | 1.50 |
| Flexural |  |  |  |  |
| Strength (psi) | 3088 | 2199 | 2756 | 2570 |
| Modulus (psi × $10^6$) | 2.16 | 1.59 | 2.06 | 1.65 |
| Compressive |  |  |  |  |
| Strength (psi) | 5129 | 6318 | 5640 | 6737 |
| Modulus (psi × $10^6$) | 2.25 | 1.44 | 2.23 | 1.58 |
| Specific gravity | 1.39 | 1.45 | 1.41 | 1.45 |

It will be noted that samples C and D containing the fluffed graphite fibers in many instances show improved strengths over samples containing equal amounts of unfluffed graphite fibers. It is believed that such improvements are due to the isotropic nature of the fibers whereby unidirectional strength characteristics are disturbed and become more multidirectionally distributed.

EXAMPLE III

Fibrous graphitized reinforcement was prepared in accordance with Example I. A binder was prepared of a thermosetting resin of furfuryl type and carbon filler in the form of coke particles, in the proportion of 50% resin to 50% filler. specifically, the coke particles were any one of various commercially available forms having some graphitic nature. The resin was that disclosed in the patent to Shaffer, U.S. Pat. No. 3,544,530 (in accordance with Shaffer patent Example IV but with the mol equivalents of maleic and resorcinol modified to correspond to Shaffer patent Example I). The carbon filler particles were of sufficient fineness to pass a No. 60 mesh, with 20% being sufficiently small to pass a No. 250 mesh. The binder was mixed to a past-like slurry.

The fibrous reinforcement was mixed with the binder in the ratio of 1:3, (reinforcement to binder ratio), until the reinforcement was thoroughly distributed. This carbonizable structure was then placed in a mold of desired shape and cured at 750° F. and 3000 psi. As will be apparent to those skilled in the art, the rate of heating to temperature, and the hold time at temperature, are to be varied in accordance with the materials used and also with the amount of material and the shape of the product being molded. These factors determine the amount of outgassing at varying temperatures and the rate of heating without harmful effects. The pressures used also are selectively varied in accordance with the size, shape, and desired density for the part being molded. considering these variables, however, processes in accordance with the invention proceed much more quickly than prior processes. Using this process materials could be heated to 750° F. in a total time equivalent to that which prior processes have required to reach 350° F., and far shorter than heretofore required to reach 750° F. Maintenance of the final temperature, or heat soaking, is also diminished by ½ or more.

Under these conditions, the part was not only fully cured and required no post curing, but also was partially carbonized. The resins involved continue low temperature breakdown to approximately 650° F., and outgassing during subsequent processing appears to be reduced by approximately 80%. Thereafter the solid part was fully carbonized in an inert atmosphere by heating to 1500° F. and pyrolized in an inert atmosphere at 4400° F. The high temperature pyrolysis or graphitization could be combined with the full carbonization step and is used to restore physical characteristics that are diminished by the lower temperature carbonization as well as provide the graphitic crystalline structure.

Figure 5:
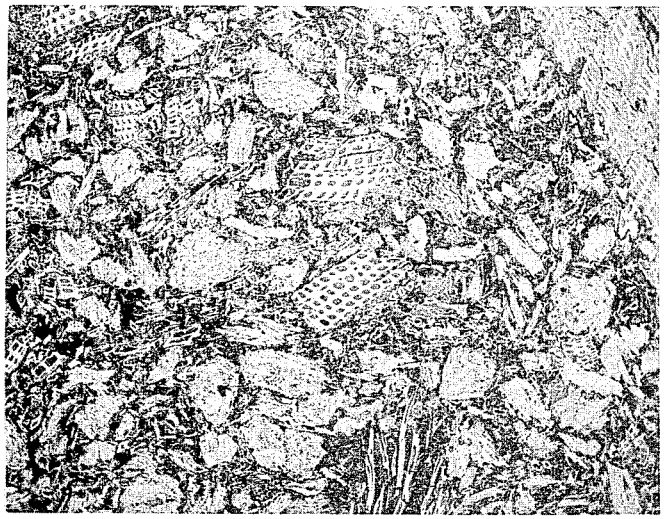
FIG. 5 is X photomicrograph 75Xphotomicrograph of a section of a composite in accordance with the invention using porous cellular reinforcement and an improved binder material.

The resultant product had the sppearance when sectioned of the photomicrograph of FIG. 5. Here it will be noted that the matrix and reinforcement are not distinct and approach homogeneity, and that the overall structure is uniform and free of voids. The reinforcement has therefore been completely wetted, and the binder-reinforcement interface is intimate and strong. The carbon particles form a chemical bond to the encompassing matrix material during pyrolysis. Moreover, the outgassing has been effected in such fashion as to leave a dense void-free matrix.

This body has the following characteristics:
Carbon content: 99.8%
Type of reinforcement: Graphitic fibers of *Larix occidentalis* origin
Tensile strength: 1400 psi
Tensile modulus: $1.3 \times 10^6$ psi
Compressive strength: 8583 psi
Specific gravity: 1.48 g/cc
Flexural strength: 1858 psi
Resistivity: 10.5 ohm/inch
Barcol hardness: 20
Thermal conductivity at 500° F.: 126 BTU in/hr $FT^2$°F This product constitutes a uniformly strong, graphite fiber reinforced homogeneous product produced by high pressure techniques. The strength and uniformity are achieved at significantly lower cost in obtaining comparable prior art products. While the mechanisms and phenomena involved are not understood with certainty, they are believed to rest on the following considerations. First, the cellular reinforcement absorbs tendencies toward differential shrinkage during curing, as previously mentioned. Also, the cellular reinforcement and the carbon filler particles provide escape routes for the volatiles during outgassing. Moreover, the binder has what may be called a knittable characteristic at all significant temperature levels during processing. That is, during the initial molding phase the furfuryl is partially but not fully set, retaining adequate structural integrity to avoid deformation. Furthermore, furfuryl forms relatively low proportions of gaseous products, and outgassing begins at low temperatures, such as 200° F. and continues to a relatively low maximum, such as approximately 650° F. In this range the controlled furfuryl structure still molds or "knits" together during curing and transformation, occupying the voids and providing the desired dense, uniform structure. A hard set does not occur until 650° F. or more. Because such temperatures are used in the production molding step, this means that the product of molding is essentially a carbon-carbon composite. The partially carbonized part itself can be used for insulative applications. Further carbonization to obtain greater purity can be limited in extent, and fully carbonized parts are directly useful for relatively low density insulators that do not require high strength. After pyrolysis, however, reimpregnation and deposition steps can virtually be disregarded because the product is so uniform and void free that no significant benefit is realized.

The furfuryl resins that may be employed to best advantage are defined in Shaffer U.S. Pat. No. 3,544,530. Resins of this class are also preferred because they thoroughly wet and impregnate the reinforcement whether random fibrous masses or fabric and give a dense, homogeneous structure. Such resins also have relatively low proportions of products of decomposition and require lower outgassing temperatures than most other resins that are typically used in carbon-carbon systems.

EXAMPLE IV

Figure 6:
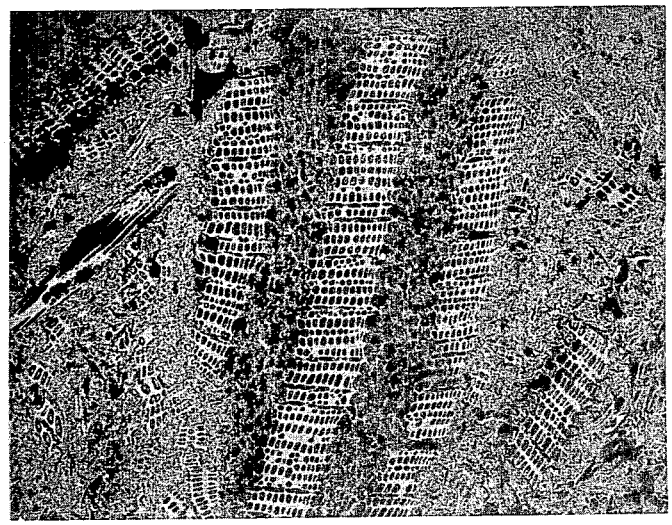
FIG. 6 is a 75X photomicrograph of a section of a different composite using porous cellular reinforcement and a different improved binder material.

Fibrous graphitized reinforcement products were prepared according to the procedure of Example I, using the 1:3 weight ratio of reinforcement to binder, and the graphite reinforcement of *Larix occidentalis* origin. The specific material for the binder used in this is sold under the trade designation "Dylon Grade GC", by Dylon Industries of 14430 Indian Creek, Cleveland, Ohio and appears to comprise a mixture of approximately 50% carbon filler in the form of coke, a significant amount of furfural resin, and amounts of various other constituents, including petroleum based oil, the precise formulation not being significant because of the commercial availability of the product. The binder and reinforcement were thoroughly mixed and subjected to the molding and partial carbonizing step, followed by the carbonization and pyrolysis steps as previously described re Example III. The resultant product was as appears in the photomicrograph of FIG 6, and had the following properties:
Carbon content: 99.9%
Type of reinforcement: Graphitic fibers of *Larix occidentalis* origin
Tensile strength: 1250 psi
Tensile modulus: $1.2 \times 10^6$ psi Compressive strength: 8200 psi
Specific gravity: 1.36 g/cc
Flexural strength: 1624 psi
Resistivity: 11.0 ohm/inch
Shore "D" hardness: 75
Thermal conductivity at 500° F.: 130 BTU in/hr FT$^2$°F As may be seen by comparison of the values given for Example IV relative to Example III, the structure has somewhat lower physical characteristics. Nevertheless, the values are remarkably high for a low cost, rapidly processed part. In FIG. 5 it may be seen that the porous cellular reinforcement is fully impregnated with binder, and that the particle filler material is uniformly distributed and firmly united to the binder.

EXAMPLE V

Figure 7:
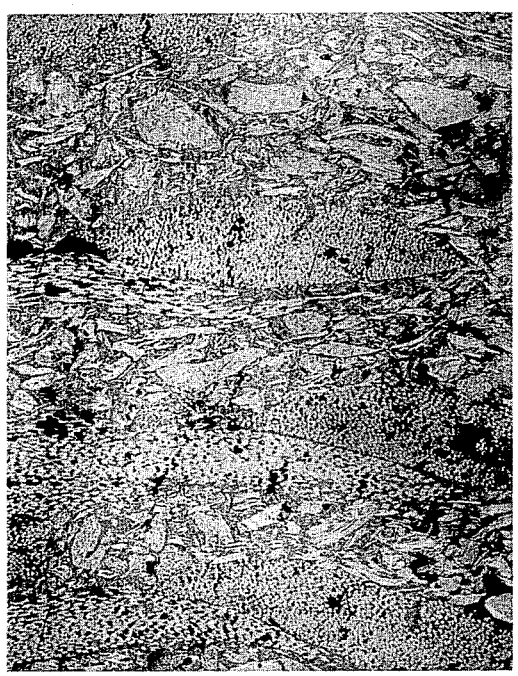
FIG. 7 is a 75X photomicrograph of a section of a discretely layered, fabric reinforced composite in accordance with the invention.

New classes of fabric reinforced products are provided by the use of improved binder materials in accordance with the invention. FIG. 7 is a 75 X photomicrograph of a section of a discretely layered fabric reinforced carbon-carbon system. In the prior art, using conventional fabric impregnation techniques to form carbon-carbon composite systems, the plies are essentially in contact after molding, but here they are separated by a discrete layer of essentially homogeneous matrix. In the photomicrograph the individual filaments of the separate yarns are clearly discernible in cross-section, and also discernible in side section. The yarns are flattened to a tapered shape because of a separate pressurizing step. Important points to note are that the binder is well distributed through the fiber bundle, and essentially homogeneous and distinct in each discrete layer between the fabric plies. The carbon filler particles, seen as lighter, bounded areas of varying shape, are also uniformly dispersed. The darkest areas are void areas, but it is to be noted that these are a very small proportion of the area and well distributed.

The product of FIG. 7 was prepared using a HITCO Graphite Cloth, Type G1736 as the reinforcement. The paste-like slurry of Example IV was compacted onto the surfaces of the fabric by pressure rollers to force the binder into the fabric and provide a binder : reinforcement weight ratio of approximately 2:1. The fabric was laid up in the desired form, then molded and partially carbonized, fully carbonized and pyrolyzed as described in conjunction with Example III, except interlaminar molding pressure was 1500 psi. The knittable and controlled characteristic of the binder, and the presence of the filler particles, here cooperate with gas escape routes provided along the yarns to give a dense homogeneous structure. Of great importance here, it should be noted that the crucial aspect of interlaminar shear strength does not suffer despite the presence of discrete inter-fabric layers. In one instance, a carbon-carbon composite in accordance with the invention having seven plies per ¼ inch and separated by discrete binder layers had 1600 psi interla inar shear strength, by contrast to a comparable competitive product having approximately 14 plies per ¼ inch that had 1400 psi interlaminar shear strength.

The product of FIG. 7 had the following physical properties:
Carbon content: 100%
Type of reinforcement: G1736 Graphite Fabric (HITCO)
Tensile strength parallel to plies: 9599 psi
Tensile modulus: 2.8 × 10$^6$ psi
Compressive strength parallel to plies: 16227 psi
Compressive strength perpendicular to plies: 18233 psi
Compressive modulus: 3.1 × 10$^6$ psi
Block tensile: 600 psi
Specific gravity: 1.52 g/cc
Flexural strength, perpendicular to plies: 15,500 psi
Flexural modulus: 2.4 × 10$^6$ psi
Resistivity (parallel to plies): 9.2 ohm/inch
Beam shear: 1700 psi
Shore "D" hardness: 80
Coefficient of thermal expansion
   perpendicular to plies at 200° F: 0.40
   parallel to plies at 200° F: 0.20
Thermal conductivity at 500° F: 35 BTU in/hr FT$^2$°F

CONCLUSION

As previously noted, an important advantage and distinction of the invention is in the highly porous nature and cellular characteristics of the stabilized fibers produced and the number of useful resin impregnated products prepared therefrom. Because of the fiber characteristics molding compositions containing high amounts of resin may be molded without special techniques at much faster rates than previously. Additionally, resin is present in the molding compositions much more homogeneously than attainable with carbonized or graphitized rayon or similar precursor fibers. Where certain resins are used, reimpregnation and infiltration may be used in conventional fashion. With improved binder materials as disclosed, however, the need for such processing is eliminated in most instances. The result is that ablative and high temperature resistant parts and structure having the desired shape and dimensional characteristics may thereafter be cured, partially carbonized, fully carbonized and graphitized without cracking or significant altering of shape and dimensions. Further, cure and partial carbonization times are greatly reduced over previously used carbon or graphite fiber compositions thereby lowering product preparation costs as much as 20–30 times. The products may also be molded in the form of practically unlimited shapes attainable by wrapping, winding or even hand layup techniques required for fabric or filament reinforced structures. In addition, the fibers of the present invention are relatively inexpensive because of low precursor fiber costs and yet yield products having high strength properties and which are relatively low in density and resistant to thermal shock and high temperature environments in applications up to about 6000° F. The products are easy to machine and may be further coated with materials to resist oxidative attack of exposed surfaces at elevated temperatures. These as well as other advantages will be evident to those skilled in the art.

What is claimed is:

1. A method for producing carbon fibers suitable for molding compositions comprising leaching *Larix occidentalis* fibers to remove soluble carbohydrates and form small porous cellular fibrous structures of substantially non-uniform size and shape, the fibrous structures being between about 1/8 and 1 inch and between about 0.02 inch and 0.25 inch in diameter, initially carbonizing the fibers at temperatures reaching between about 1800° and 2400° F. and thereafter stabilizing the leached carbonized fibers at temperatures between about 3800° and 5500° F. in a non-oxidizing atmosphere while retaining the original shapes of the porous cellular fibrous structures.

2. The method of claim 1 including the steps of macerating the fibers after the leaching step to the given size range in length and diameter, and thereafter subjecting the fibers to temperatures between about 3800° F. and 4600° F.

3. A method of preparing shaped structures comprising mixing *Larix occidentalis* fibers which have been leached and carbonized and which have been stabilized at a temperature of at least about 3800° F. under a non-oxidizing atmosphere with a carbonizable thermosetting resin to form an essentially homogeneous molding composition, molding the composition within heated molding apparatus while curing the resin at a temperature of at least about 300° F., and subjecting the composition while still in the heated molding apparatus to temperature and pressure sufficient to at least partially carbonize the resin.

4. The method as set forth in claim 3 above wherein said resin comprises carbon particle filler in a pastelike slurry.

* * * * *

UNITED STATES PATENT AND TRADEMARK OFFICE
CERTIFICATE OF CORRECTION

PATENT NO. : 3,927,157
DATED : December 16, 1975
INVENTOR(S) : Paul F. Vasterling Page 1 of 2

It is certified that error appears in the above-identified patent and that said Letters Patent are hereby corrected as shown below:

Col. 1, line 17, "definitiion" should read --definition--; line 43, after "fabrics", "ae" should read --are--. Col. 2, line 47, after "strength" and before "the" (second occurrence), delete "fiber-matrix" and insert --of--; line 49, "fibr-matrix" should read --fiber-matrix--; line 62, after "properties" and before "be", "caan" should read --can--. Col. 4, lines 15 & 16, after "one" and before "or", delete "of the part, the products may be additionally treated by one"; line 58, after "is" and before "X", insert --a 75--; line 58, after "X photomicrograph" delete "75X photomicrograph". Col. 5, line 42, "mateials" should read --materials--. Col. 6, line 21, after "increments.", "specific" should read --Specific--. Col. 7, line 30, after "under" and before "ambient", "esentially" should read --essentially--. Col. 11, line 21, after "which" and before "been", "has" should read --had--. Col. 12, line 62, after "filler.", "specifically" should read --Specifically--. Col. 13, line 3, after "a" and before "slurry, "past-like" should read --paste-like--; line 19, after "molded.", "considering" should read --Considering--; line 39, after "the" and before "temperature", "lower" should read --lower--; line 40, after "graphitic", "crystalline" should read --crystalline--; line 42, after "the" and before "when", "sppearance" should read --appearance--.

UNITED STATES PATENT AND TRADEMARK OFFICE
CERTIFICATE OF CORRECTION

PATENT NO. : 3,927,157

DATED : December 16, 1975

INVENTOR(S) : Paul F. Vasterling

It is certified that error appears in the above-identified patent and that said Letters Patent are hereby corrected as shown below:

Col. 15, lines 47 & 48, after "except" and before "molding", delete "interlaminar" and insert --that the--; line 58, after "psi" and before "shear", "interla inar" should read --interlaminar--. Col. 16, line 61, after "inch" and before "and" insert --in length--.

Signed and Sealed this first Day of June 1976

[SEAL]

Attest:

RUTH C. MASON
Attesting Officer

C. MARSHALL DANN
Commissioner of Patents and Trademarks